Figure 1:
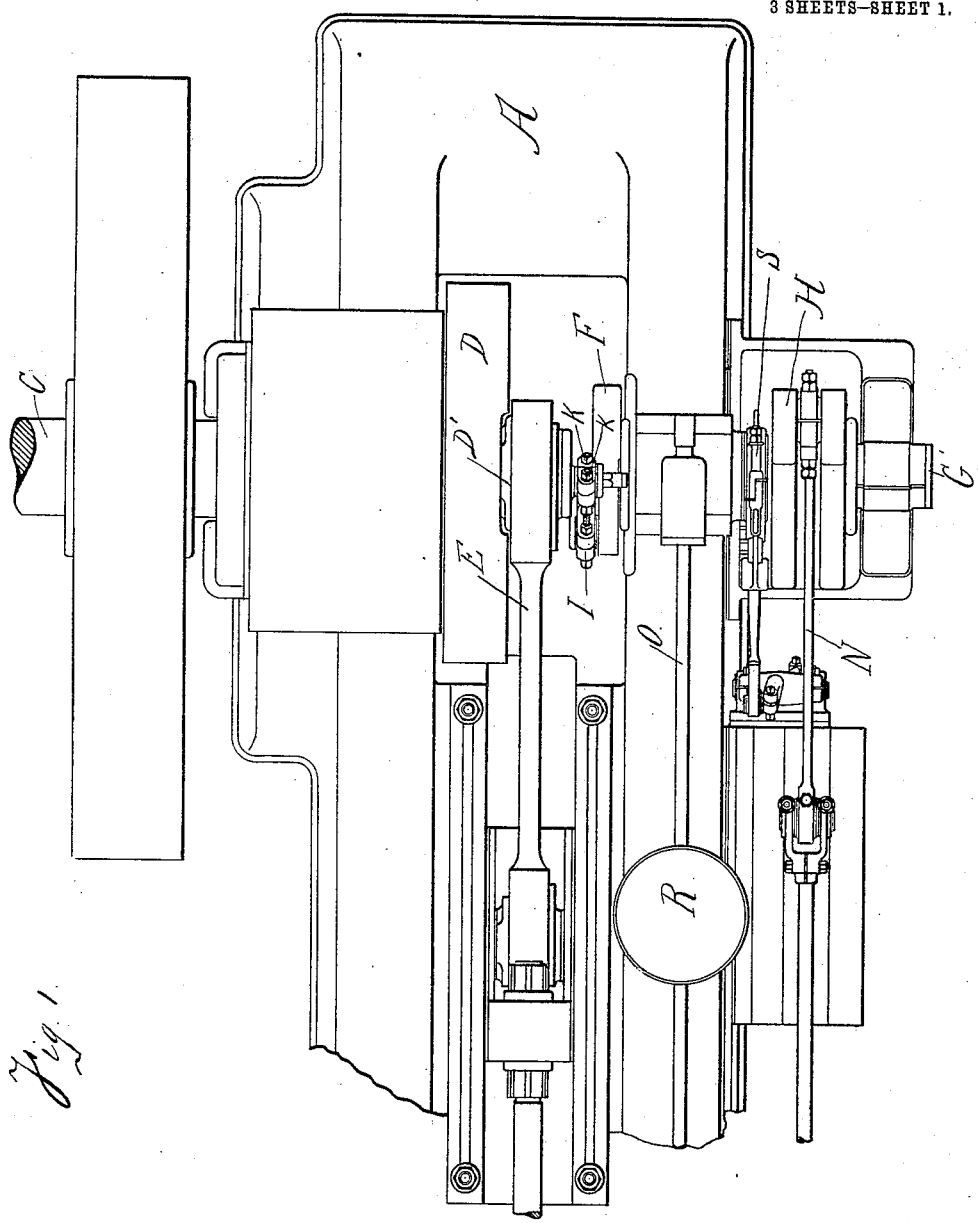

B. M. ASLAKSON.
MEANS FOR DRIVING AIR AND GAS PUMPS.
APPLICATION FILED JUNE 18, 1908.

1,007,662.

Patented Nov. 7, 1911.

3 SHEETS—SHEET 1.

WITNESSES:

INVENTOR

Baxter M. Aslakson

BY

Frank W. Ashley

ATTORNEY

B. M. ASLAKSON.
MEANS FOR DRIVING AIR AND GAS PUMPS.
APPLICATION FILED JUNE 18, 1908.
1,007,662.
Patented Nov. 7, 1911.
3 SHEETS—SHEET 2.
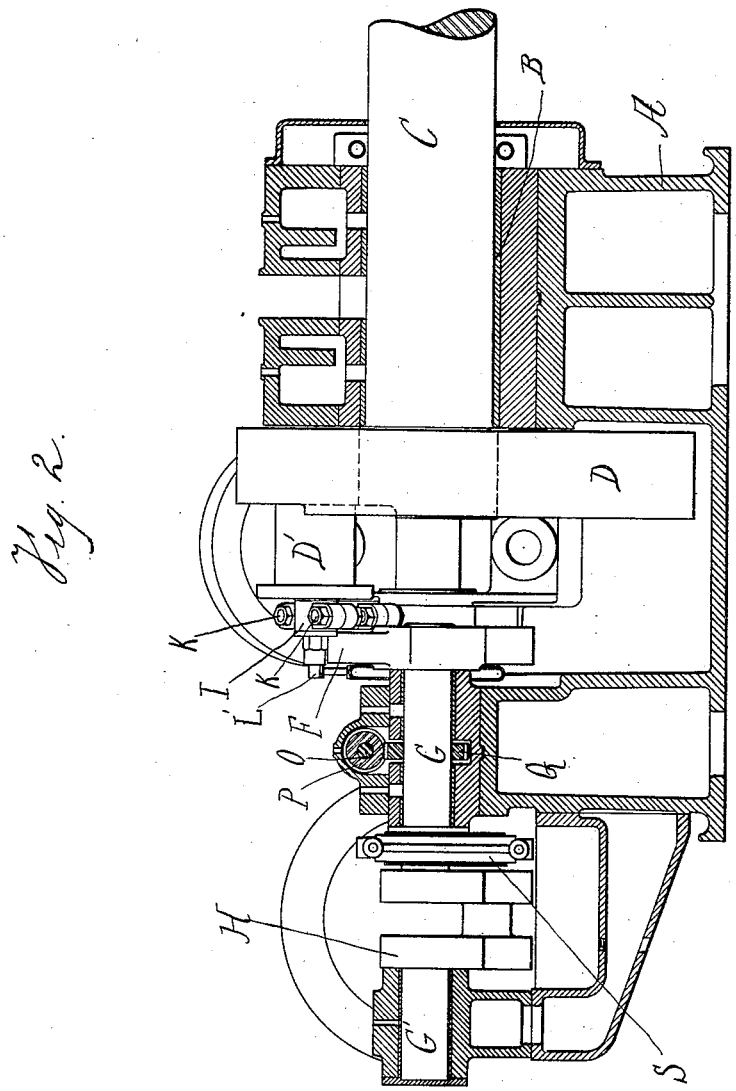
WITNESSES:
INVENTOR
BY
ATTORNEY

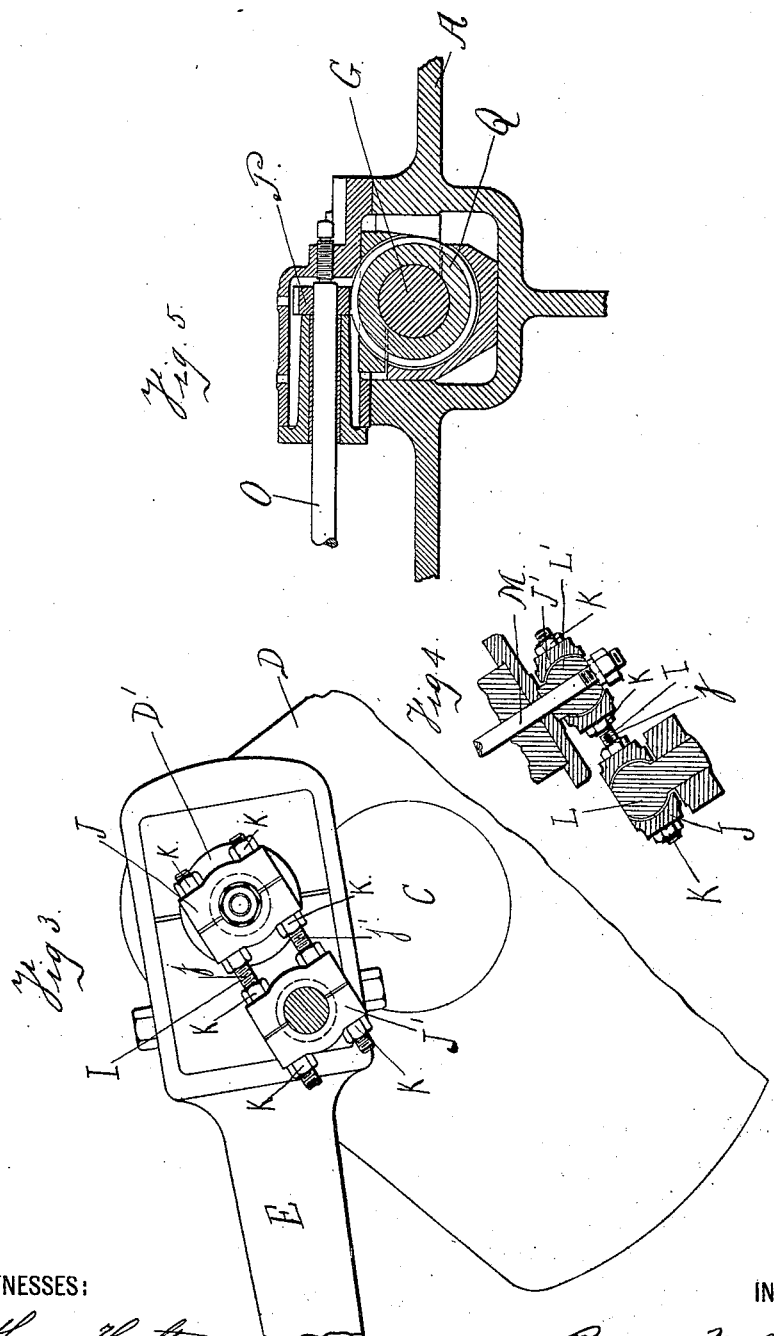

UNITED STATES PATENT OFFICE.

BAXTER M. ASLAKSON, OF SALEM, OHIO.

MEANS FOR DRIVING AIR AND GAS PUMPS.

1,007,662.  Specification of Letters Patent.  Patented Nov. 7, 1911.

Application filed June 18, 1908. Serial No. 439,132.

*To all whom it may concern:*

Be it known that I, BAXTER M. ASLAKSON, a citizen of the United States, and residing at Salem, Columbiana county, Ohio, have invented certain new and useful Improvements in Means for Driving Air and Gas Pumps, of which the following is a specification.

My invention relates to gas engines and particularly to means for driving a gas and air pump through the instrumentality of a flexible connection.

The object of my invention is to provide a flexible means to be located between the main crank of the engine and an auxiliary crank and to drive the latter crank by the former through the flexible means, and to provide a novel and efficient construction of the latter.

Referring to the drawings which form a part of this specification,—Figure 1, is a plan view of a portion of a gas engine in which is disclosed my arrangement of the cranks and flexible means. Fig. 2, is a cross sectional view through the bearing of the main shaft of the engine and the auxiliary shaft bearings, disclosing the two cranks and the flexible means located between them. Fig. 3, is a side view of the flexible driving means. Fig. 4, is a sectional plan view of the flexible driving means. Fig. 5, is a cross sectional view through the auxiliary shaft and disclosing the lay shaft of the engine and means for driving same.

A, indicates the frame of a gas engine having a main bearing B and main shaft C, and mounted on one end of said shaft is the main crank D, which is provided with the usual crank pin D'.

E, indicates the main connecting-rod which is connected to the crank pin D' in the usual manner.

F, indicates an auxiliary crank which is mounted on a short shaft G, which shaft is connected to and drives a third crank H, which crank is the driving crank for operating the gas and air pump of the engine.

G' indicates a short shaft which is also connected to the crank H, as shown, and the axis of the shafts G and G' are in line with the axis of the main shaft C. Now since the main shaft C and the auxiliary shafts G and G' are supported in separate bearings and subject to a different rate of wear, the axis of the two shafts may get out of alinement with each other and thus subject the respective parts to undue strain and friction, which will cause the bearings to overheat and cause trouble. To overcome this difficulty, I have provided a flexible connection comprising a link I, which is constructed in such a manner as to provide means for increasing or decreasing the length between its boxes J and J', each of which is made in two halves which are duplicates of each other, and are provided with flanges, each containing a hole through which threaded bolts *j* and *j'* are passed and secured therein by means of nuts K—K, etc., which screw thereon and abut the opposite sides of said boxes as shown to hold them apart a proper distance from center to center, as will be readily understood. The boxes J and J' are each provided with a ball shaped surface which fits over the globe shaped ends of the crank-pins L and L' respectively, to form a flexible joint which will permit of a certain amount of lateral movement between the respective cranks to which they are connected. The ball shaped ends of the crank-pins may be formed of a separate piece of metal as shown at L' and held to the crank by a bolt M, as indicated. The crank-pin D' is arranged to travel in advance of the crank-pin of crank F, to form a drag-crank connection, the pin L' being connected to and projecting from the main crank-pin D', and the crank-pin L being connected to the crank F, as indicated.

N, indicates the connecting rod by means of which the pumps are driven, and O indicates the lay shaft, which is driven by a worm gear P, which in turn is driven by gear Q, which is mounted on the shaft G, as shown. The lay shaft drives the governor R and operates the valves of the engine.

S, indicates an eccentric which drives a valve gear to operate the valves of the air and gas pump.

By the use of this flexible connection, overheating due to uneven wear or disalinement of the two shafts is obviated, and the engine may be operated a considerably longer period without overhauling than would be possible were the main and auxiliary shafts directly connected, and a single main crank may be used in place of a double one.

Having thus described my invention, what I claim as new and desire to secure by Letters Patent, is:—

1. The combination of relatively fixed bearings spaced apart, shafts respectively journaled in the said bearings, a driving crank attached to one of the shafts and having a crank pin, a crank attached to the other shaft having a crank pin, a crank pin attached to the crank pin of the driving crank, the crank pin of the second named crank and the crank pin attached to the crank pin of the driving crank having ball surfaces, and a link operatively connecting the crank pins with the ball surfaces having boxes provided with ball sockets.

2. The combination of relatively fixed bearings spaced apart, shafts respectively journaled in the said bearings, a driving crank attached to one of the shafts and having a crank pin, a crank attached to the other shaft having a crank pin, a crank pin attached to the crank pin of the driving crank, the crank pin of the second named crank and the crank pin attached to the crank pin of the driving crank having ball surfaces, a link operatively connecting the crank pins with the ball surfaces having boxes provided with ball sockets, and means for adjusting the boxes to correspond with the distance between said crank pins to which they are respectively connected.

In testimony whereof, I have signed my name to this specification in the presence of two subscribing witnesses, this tenth day of January, 1908.

BAXTER M. ASLAKSON.

Witnesses:
 FRANK M. ASHLEY,
 A. T. SCHARP.

Copies of this patent may be obtained for five cents each, by addressing the " Commissioner of Patents, Washington, D. C."